United States Patent
Kim et al.

(10) Patent No.: US 8,733,967 B2
(45) Date of Patent: May 27, 2014

(54) PORTABLE TERMINAL WITH LIGHTING DECORATION

(75) Inventors: Dong-Lyul Kim, Daegu (KR); Youn-Woong Kim, Gyeongsangbuk-do (KR); Ik-Su Jung, Gyeonggi-do (KR); Keun-Young Lee, Seoul (KR); Jae-Youl Kwon, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 551 days.

(21) Appl. No.: 12/714,612

(22) Filed: Mar. 1, 2010

(65) Prior Publication Data
US 2010/0232150 A1    Sep. 16, 2010

(30) Foreign Application Priority Data

Mar. 11, 2009  (KR) .................. 10-2009-0020818

(51) Int. Cl.
*F21V 1/00* (2006.01)

(52) U.S. Cl.
USPC .................................. 362/217.02

(58) Field of Classification Search
USPC .................................. 362/217.02
See application file for complete search history.

(56) References Cited

U.S. PATENT DOCUMENTS

| | | | |
|---|---|---|---|
| 5,237,607 A * | 8/1993 | Diamantis .................. 379/419 |
| 7,336,980 B1 * | 2/2008 | Kaikuranta et al. ........ 455/575.6 |
| 7,338,193 B1 * | 3/2008 | Zeiger et al. ................. 362/551 |
| 2001/0018332 A1 * | 8/2001 | Lustila et al. ................. 455/90 |
| 2007/0012489 A1 * | 1/2007 | Kim et al. .................. 178/18.01 |
| 2007/0032275 A1 * | 2/2007 | Suzuki et al. ............. 455/575.3 |
| 2009/0027874 A1 | 1/2009 | Chang | |
| 2010/0081470 A1 * | 4/2010 | Lee et al. .................. 455/556.1 |

FOREIGN PATENT DOCUMENTS

DE        10319672 A1 * 11/2004

* cited by examiner

*Primary Examiner* — Anh Mai
*Assistant Examiner* — Hana Featherly
(74) *Attorney, Agent, or Firm* — Cha & Reiter, LLC.

(57) ABSTRACT

A portable terminal includes a housing, a light tube arranged along at least one part of a circumference of the housing, and a tube guide mounted along the circumference of the housing. As light is incident on the light tube and propagates along the light tube, the light radiates through a circumferential surface of the light tube, and the radiated light is diffused through the tube guide.

13 Claims, 4 Drawing Sheets

PORTABLE TERMINAL WITH LIGHTING DECORATION

CLAIM OF PRIORITY

This application claims the benefit of priority under 35 U.S.C. §119 of a Korean Patent Application filed in the Korean Intellectual Property Office on Mar. 11, 2009 and assigned Serial No. 10-2009-0020818, the entire disclosure of which is hereby incorporated by reference its entirety.

BACKGROUND OF THE INVENTION

1. Field of the Invention

The present invention relates generally to a portable terminal. More particularly, the present invention relates to a portable terminal with lighting decoration.

2. Description of the Related Art

Commonly, a "portable terminal" typically refers to a device that is typically utilized for mobile communications with another party, including voice calls, texting typically via Short Message Service (SMS), while being carried by a user as he/she travels from one place to another. In addition, a portable terminal device allows a user to enjoy contents stored in the terminal itself and/or access contents provided from the mobile communication service providers. While the conventional portable terminal has limited functions, such as an electronic dictionary, an MP3 player and a portable game player, the recent mobile communication terminal may provide a variety of functions, in addition to the voice call and SMS functions, including but not limited to mobile games, MP3 playback, an electronic dictionary, schedule management, and Digital Multimedia Broadcasting (DMB) viewing.

The mobile communication service providers typically provide a variety of contents such as a plurality of ring tones, mobile games, and different wall papers accessible by the portable terminals, thereby making good profits. The provision of such services has become possible because of the wide popularity of the portable terminals (also referred to as mobile communication terminals) to reduce the costs per unit to provide such services, and because of an ever increasing need for such contents.

A portable terminal used for mobile communication currently serves not only as a device for providing a communication function and the like, but also as a fashion item to a certain class of users. In line with this trend, many users decorate or modify their terminals in various shapes by putting protection covers on the terminals, painting the cases, attaching decorative laces, replacing keypad lightings, and so forth.

However, the decoration or modification that the users make after purchase of the portable terminals can be an economic burden on the users, causing some to refrain from personalizing their portable terminals, and modification or unauthorized alteration of the portable terminals can void their warranty, and in the case of leased portable terminals, violate the terms of a leasing/rental agreement. In addition terminal manufacturers may not warranty the replacing of items such as keypad lightings, as modifying the portable terminals may increase the likelihood of device failure. Though users' tastes are diversified and portable terminals serve as fashion items, the portable terminals available on the market have a limit on representing individualities of the users, which instigates the modification or alteration of the terminals.

SUMMARY OF THE INVENTION

An aspect of the present invention is to provide a portable terminal with lighting decoration that is adaptable to be modified and provide a diverse number of appearances to suit the user's sense of style.

Another aspect of the present invention is to provide a portable terminal capable of preventing possible device failure by reducing the need for unauthorized modifications or alterations.

Furthermore, another aspect of the present invention provides a portable terminal that doubles as a fashion item even without separate decoration or painting, by using Light Emitting Diode (LED) lighting decoration that can realize a variety of colors and visual effects.

In accordance with one exemplary aspect of the present invention, there is provided a portable terminal including a housing, a light tube arranged along at least one part of a perimeter of the housing, and a tube guide mounted along the perimeter of the housing. As light is incident on the light tube and propagates along the light tube, the light radiates through a circumferential surface of the light tube, and the radiated light is diffused through the tube guide.

The housing may include, for example, a front case, and a rear case which is engaged with the front case face-to-face, and the tube guide may be engaged between the front case and the rear case.

Preferably, in an exemplary aspect of the invention, there are light sources arranged close to both ends of the tube guide, respectively, and each end of the light tube is arranged to face any one of the light sources at a respective end of the tube guide.

Preferably, in an exemplary aspect of the invention, a light-tight member is further provided to each end of the tube guide in one united body, and the light-tight member may be engaged to wrap up/shield an end of the light tube.

Preferably, in an exemplary aspect of the invention, the portable terminal further includes a front case and a rear case which are engaged face-to-face to form the housing, a dome sheet which is mounted between the front case and the rear case and arranged at one side of the housing, and light sources mounted on the dome sheet.

The tube guide is mounted between the front case and the rear case, and each end of the light tube may be arranged to face any one of the light sources at a respective end of the tube guide.

Preferably, in an exemplary aspect of the invention, a pair of the light tube and the tube guide is arranged along a circumference of the housing, and the light tube and the tube guide may extend from one side of the housing to the other side passing along any one of an upper end surface and a lower end surface of the housing.

Other exemplary aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION

The following description, with reference to the accompanying drawings, is provided to assist in a comprehensive understanding of exemplary embodiments of the invention as defined by the claims and their equivalents. It includes various specific details to assist in that understanding but these details are to be regarded as merely exemplary. Accordingly, those of ordinary skill in the art will recognize that various changes and modifications of the embodiments described herein can be made without departing from the scope and spirit of the invention. The claimed invention is not limited to the examples shown and described herein. In addition, descriptions of well-known functions and constructions may be omitted for clarity and conciseness so as not to obscure appreciation of the invention by a person of ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents. For example, while the description refers to a "perimeter" and a "circumference", a person of ordinary skill in the art should understand and appreciate that the portable terminal housing is typically rectangular in shape with the edges rounded. Thus when the description refers to light guide tubes, etc. being arranged along a part of circumference or a perimeter of the housing, the arrangement is typically along portions of a boundary or outline of the housing.

It is to be understood that the singular forms "a," "an," and "the" include plural referents unless the context clearly dictates otherwise. Thus, for example, reference to "a component surface" includes reference to one or more of such surfaces.

Figure 1:
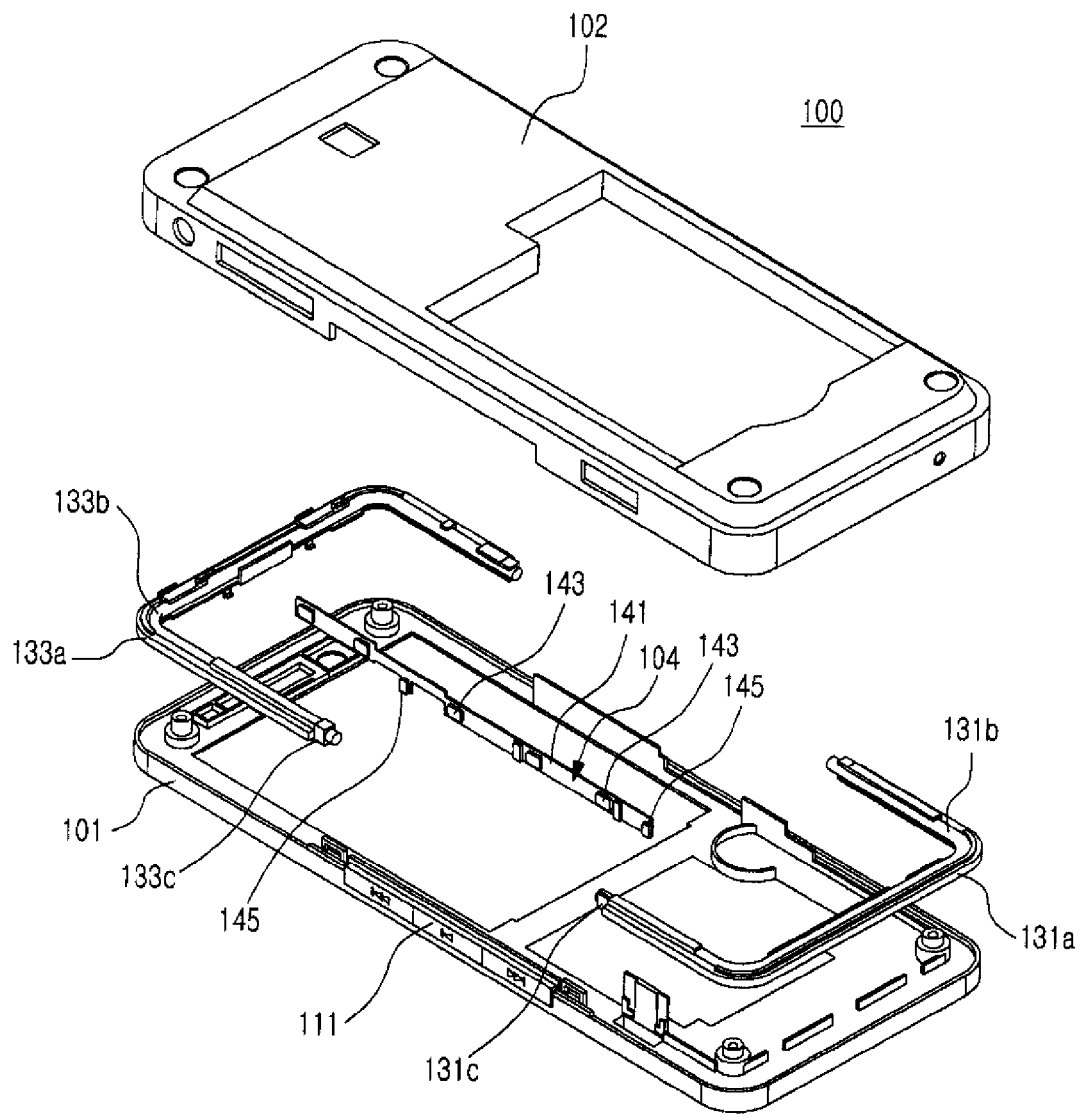
FIG. 1 is an exploded perspective view illustrating a portable terminal according to an exemplary embodiment of the present invention.
Figure 2:
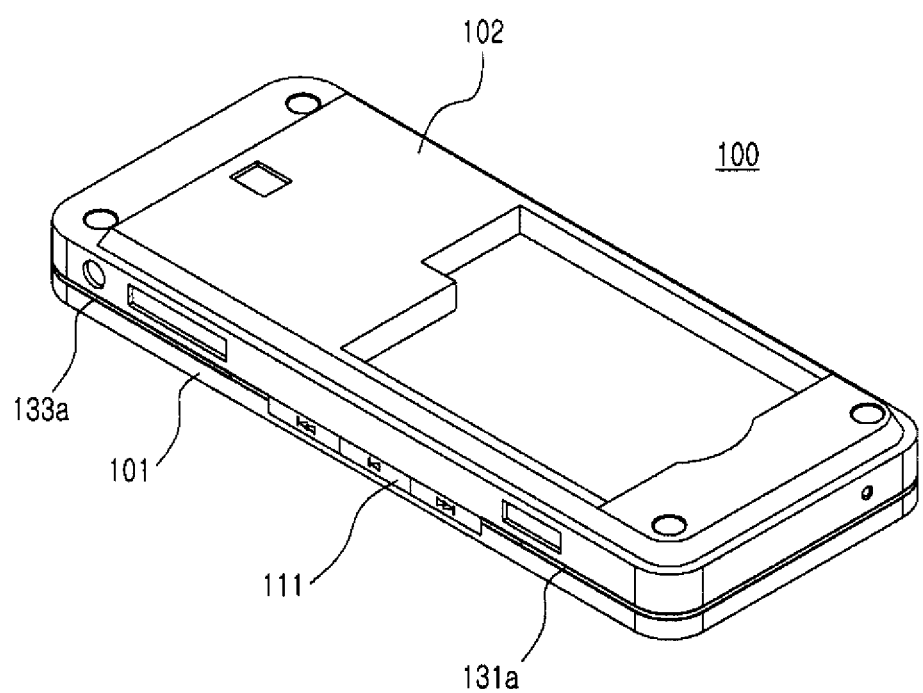
FIG. 2 is an assembled perspective view illustrating the portable terminal illustrated in FIG. 1.

FIG. 1 is an exploded perspective view illustrating a portable terminal 100 according to an exemplary embodiment of the present invention, and FIG. 2 is an assembled perspective view illustrating the portable terminal 100 illustrated in FIG. 1.

As illustrated in FIGS. 1 and 2, a portable terminal 100 according to an exemplary embodiment of the present invention has lighting decoration that includes light tubes 131b and 133b and tube guides 131a and 133a.

In the exemplary embodiment, the portable terminal 100 has a housing that includes a front case 101 and a rear case 102, which are engaged face-to-face. Although not illustrated, input devices such as a display device and or a keypad/touchpad are preferably mounted on the front of the housing, whereas a battery pack is received in the rear of the housing, and a cover is mounted thereon to protect the battery pack. Although a bar-type terminal is disclosed herein as an example of the portable terminal 100, it will be understood by those skilled in the art that the lighting decoration made of the light tubes 131b and 133b and the tube guides 131a and 133a may be installed in folder-type, swing-type and sliding-type portable terminals, just to name a few possible configurations.

The housing may include, as an input device, keys 111 mounted on its side in addition to the keypad for entering numbers and letters. The keys 111 mounted on the side of the housing are used for adjusting volume or shifting a cursor, etc., and a hot key for operating a camera and/or recording functions. In the example of FIG. 1, a Play/Stop key that is used for a music playback mode, and the like, are preferably mounted on the side of the housing.

The light tubes 131b and 133b are preferably manufactured with transparent materials, and extended in their longitudinal directions. When the light tubes 131b and 133b are mounted in the housing of the terminal 100, portions of the light tubes 131b and 133b, which are mounted at the edges of the housing, are preferably curved so that the light tubes are a good-match with the shapes of the edges of the housing. When light is incident on one ends of the light tubes 131b and 133b, the light propagates along the light tubes 131b and 133b and radiates through circumferential surfaces of the light tubes 131b and 133b.

Therefore, illumination of the light that propagates along the light tubes 131b and 133b decreases at a longer distance from the portion of the light tubes on which the light is incident. In order to prevent the illumination from noticeably decreasing in accordance with the locations of the light tubes 131b and 133b, it is preferable to arrange light sources at both ends of the light tubes 131b and 133b, and make the light incident thereon.

Figure 3:
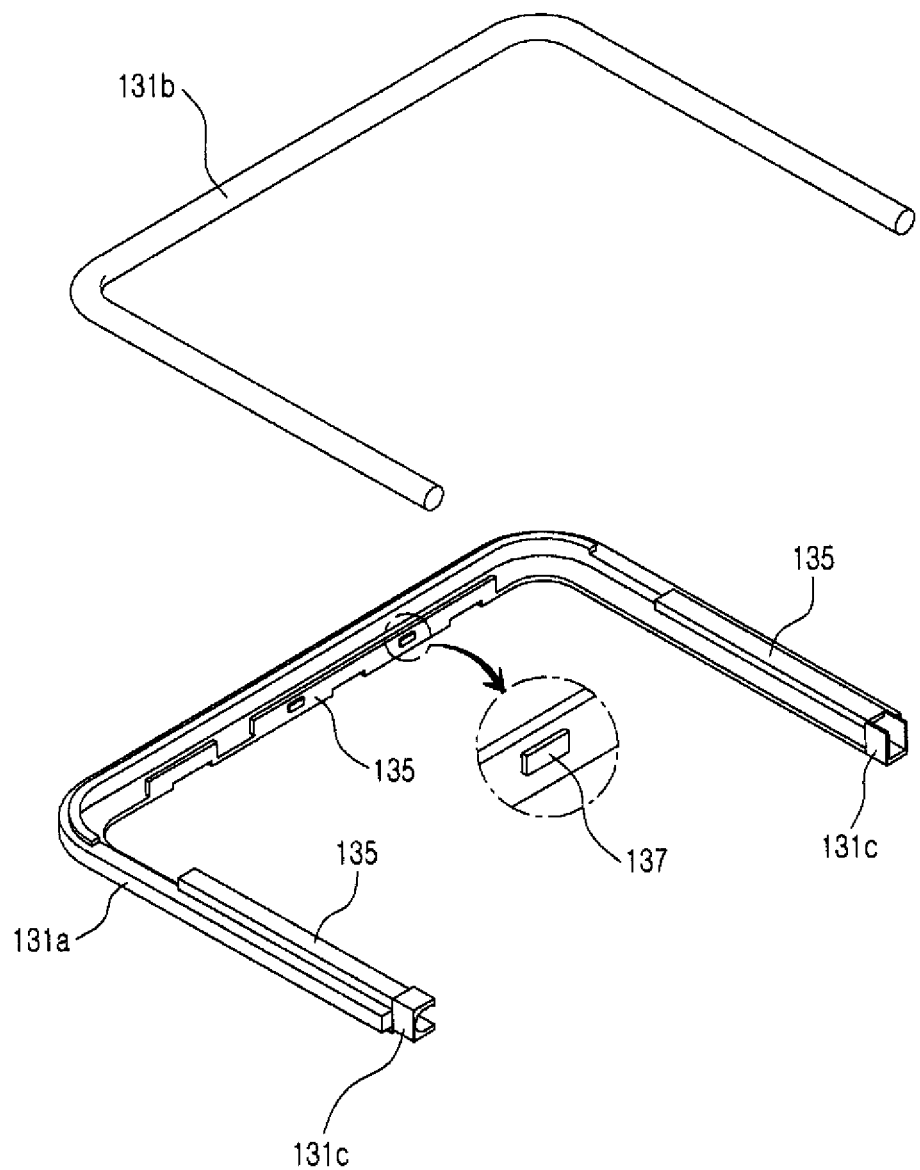
FIG. 3 is an exploded perspective view illustrating a first light tube and a first tube guide mounted in the portable terminal illustrated in FIG. 1.
Figure 4:
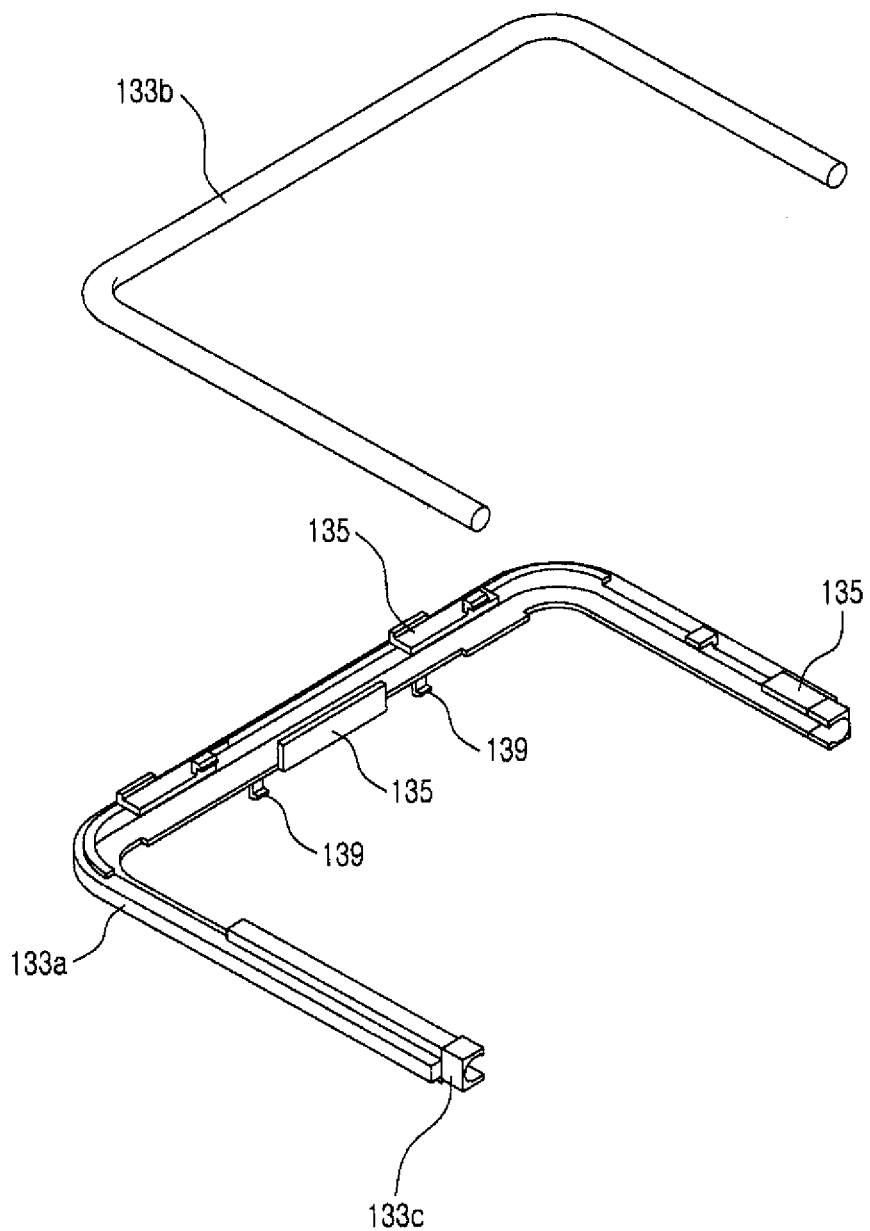
FIG. 4 is an exploded perspective view illustrating a second light tube and a second tube guide mounted in the portable terminal illustrated in FIG. 1.

Referring now to FIGS. 3 and 4, the tube guides 131a and 133a are arranged along the perimeter of the housing. In the exemplary embodiment, the tube guides 131a and 133a are installed in pairs such that they extend from one side of the housing toward the other side passing along any one of an upper end surface and a lower end surface of the housing. Clamps 135 for fixing the light tubes 131b and 133b are formed on the tube guides 131a and 133a. In this particular example, the light tubes 131b and 133b are fixed to the tube guides 131a and 133a, and then mounted in the housing.

The tube guides 131a and 133a are engaged between the front case 101 and the rear case 102, and parts of them may be exposed to the outside of the housing, forming parts of a boundary surface of the housing. Protrusions 137 (FIG. 3) and hooks 139 (FIG. 4) are formed on the front and rear cases 101 and 102, and the tube guides 131a and 133a, respectively, providing a way to arrange the tube guides 131a and 133a to any one of the front and rear cases 101 and 102.

Still referring to FIGS. 3 and 4, the light that radiates through the circumferential surfaces of the light tubes 131b and 133b is diffused through the tube guides 131a and 133a. Since portions of the tube guides 131a and 133a are exposed to the outside of the housing, the light diffused through the tube guides 131a and 133a is radiated to the outside of the housing. Therefore, the user may have an optical illusion that the tube guides 131a and 133a are emitting light.

Referring again to FIG. 1, light sources 145 for making light incident on the light tubes 131b and 133b, as described above, are preferably arranged face-to-face at both ends of the light tubes 131b and 133b. In the exemplary embodiment, light sources 145 are preferably arranged on a dome sheet 104 that faces the keys 111 mounted on the side of the housing. The dome sheet 104 is made by arranging dome switches 143 on a flexible printed circuit board 141, and the dome switches 143 are preferably disposed on the side of the housing in accordance with locations of the keys 111. The light sources 145 are also preferably positioned on the flexible printed circuit board 141 together with the dome switches 143.

Here, LEDs can be preferably used as the light sources 145. In order to realize a variety of colors, for example, it is preferable to use LEDs that emit Red (R), Green (G) and Blue (B) colors. Since color and flickering of the light emitted from the LEDs can be easily controlled, it is possible to implement various visual effects with the light that propagates through the light tubes 131b and 133b.

It is shown in FIG. 1 that the light sources 145 are arranged on only one side of the housing. However, it is preferable that the light sources 145 are arranged on both sides of the housing, and mounted proximally to the ends of the respective tube guides 131a and 133a to provide light to the light tubes as desired, and more specifically, mounted face-to-face at both ends of the light tubes 131b and 133b. The light emitted from the light sources 145 not only may be incident on the light tubes 131b and 133b, but also may provide lighting for the keys 111 mounted on the side of the housing.

Meanwhile, still referring to FIG. 1, the light sources 145 are not exposed to the outside of the housing as they are covered up by the front case 101 and/or the rear case 102, whereas the tube guides 131a and 133a, as described above, are exposed to the outside of the housing at parts thereof. Due to the exposure, light leakage may occur between the front and rear cases 101 and 102, as well as from ends of the tube guides 131a and 133a at the portions near the light sources 145. To prevent this leakage, light-tight members 131c and 133c may be mounted on ends of the tube guides 131a and 133a. The light-tight members 131c and 133c block the light emitted from the light sources 145 from being incident on the tube guides 131a and 133a or being directly radiated to the outside of the housing without being incident on the light tubes 131b and 133b. Therefore, the tube guides 131a and 133a diffuse only the light that radiates through the circumferential surfaces of the light tubes 131b and 133b.

In addition, colored synthetic resins, such as polycarbonate or a metallic material that does not transmit light, may be preferably used as materials of the light-tight members 131c and 133c. It also noted that since the light-tight members 131c and 133c made of such materials that do not transmit the light, they are different in material from the tube guides 131a and 133a that radiate light to the outside of the housing while diffusing the light. Therefore, the light-tight members 131c and 133c and the tube guides 131a and 133a may be assembled after they are manufactured through separate processes. It is also possible that the tube guides could have a coating that does permit light to be transmitted there through. Preferably, the light-tight members 131c and 133c can be manufactured at both ends of the tube guides 131a and 133a in one united body by shaping the light-tight members 131c and 133c and then performing double injection after putting the pre-manufactured light-tight members 131c and 133c in a mold for shaping the tube guides 131a and 133a.

As a result, the light emitted from the light sources 145 illuminates the keys 111 mounted on the side of the housing, or is incident on the light tubes 131b and 133b, diffused through the tube guides 131a and 133a, and then radiated. Thus, even though part of the light is not incident on the light tubes 131b and 133b, it is not radiated to the outside of the housing.

As described above, the portable terminal is provided with lighting decoration associated with its appearance, which can ease the need for unauthorized modification and alteration for the portable terminal and enable the terminal itself to be used as a good fashion item. In addition, by mounting LEDs as light sources that make light incident on light tubes, it is possible to provide light of various colors and a variety of visual effects.

Furthermore, use of the light-tight members can prevent leakage by blocking the light from being radiated to the outside without being incident on the light tubes, thereby improving completeness of the products. When light sources are mounted at both ends of the light tubes, lighting can be provided at uniform illumination all over the light tubes.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
   a housing forming front, rear and side surfaces of the portable terminal;
   a tube guide mounted to the housing along a perimeter portion of the housing, the perimeter portion being along the side surface, said tube guide having two ends, and at least a portion of the tube guide is inside the housing; and
   a light tube disposed within said tube guide,
   wherein as light is incident on the light tube and propagates along the light tube the light radiates through a circumferential surface of the light tube and the radiated light is diffused through the tube guide.

2. The portable terminal of claim 1, wherein light sources are arranged adjacent to said two ends of the tube guide, respectively, to illuminate the light tube, and each end of the light tube is arranged to face any one of the light sources at said two ends of the tube guide.

3. The portable terminal of claim 2, further comprising a light-tight member that is provided at both ends of the tube guide, wherein the light-tight member is configured to prevent light from escaping through either end of the light tube.

4. The portable terminal of claim 1, wherein a pair of the light tube and the tube guide is arranged along the perimeter portion of the housing.

5. The portable terminal of claim 4, wherein the light tube and the tube guide extend from one side of the housing to the other side passing along any one of an upper end surface and a lower end surface of the housing.

6. The portable terminal of claim 1, wherein at least portions of the tube guide are exposed to the outside of the housing such that the light diffused through the tube guide is radiated outside of the housing.

7. The portable terminal of claim 1, wherein the light tube comprises a transparent material.

8. The portable terminal of claim 1, wherein the tube guide comprises clamps for securing the light tube to an interior of the tube guide.

9. A portable terminal comprising:
   a housing forming front, rear and side surfaces of the portable terminal, the housing including a front case and a rear case which engages with the front case face-to-face;
   a tube guide mounted to the housing along a perimeter portion of the housing, the perimeter portion being along the side surface, and the tube guide is arranged between the front case and the rear case, the tube guide having two ends; and a light tube disposed within said tube guide, wherein as light is incident on the light tube and propagates along the light tube the light radiates through a circumferential surface of the light tube and the radiated light is diffused through the tube guide.

10. A portable terminal comprising:

a housing forming front, rear and side surfaces of the portable terminal, the housing formed by a front case and a rear case which are engaged to each other face-to-face housing;

a dome sheet which is positioned between the front case and the rear case and arranged at one side of the housing;

light sources arranged on the dome sheet;

a tube guide mounted to the housing along a perimeter portion of the housing, the perimeter portion being along the side surface, the tube guide having two ends;

a light tube disposed within the tube guide;

wherein as light is incident on the light tube and propagates along the light tube the light radiates through a circumferential surface of the light tube and the radiated light is diffused through the tube guide.

11. The portable terminal of claim 10, wherein the tube guide is arranged between the front case and the rear case, and each respective end of the light tube is arranged to face any one of the light sources at said two ends of the tube guide.

12. The portable terminal of claim 11, further comprising a light-tight member that is provided at both ends of the tube guide, wherein the light-tight member is configured to prevent light from escaping through an end portion of the light tube.

13. The portable terminal of claim 10, wherein the light sources comprise LEDs that emit Red (R), Green (G) and Blue (B) colors.

* * * * *

UNITED STATES PATENT AND TRADEMARK OFFICE
CERTIFICATE OF CORRECTION

PATENT NO. : 8,733,967 B2  Page 1 of 1
APPLICATION NO. : 12/714612
DATED : May 27, 2014
INVENTOR(S) : Kim et al.

It is certified that error appears in the above-identified patent and that said Letters Patent is hereby corrected as shown below:

In the Claims
Column 7, Claim 10, Lines 9-10 should read as follows:
--...other face-to-face...--

Signed and Sealed this
Twenty-ninth Day of July, 2014

Michelle K. Lee
*Deputy Director of the United States Patent and Trademark Office*